May 12, 1964 A. J. RADCLIFFE, JR 3,133,203
MAGNETIC AMPLIFIER
Filed Sept. 2, 1959
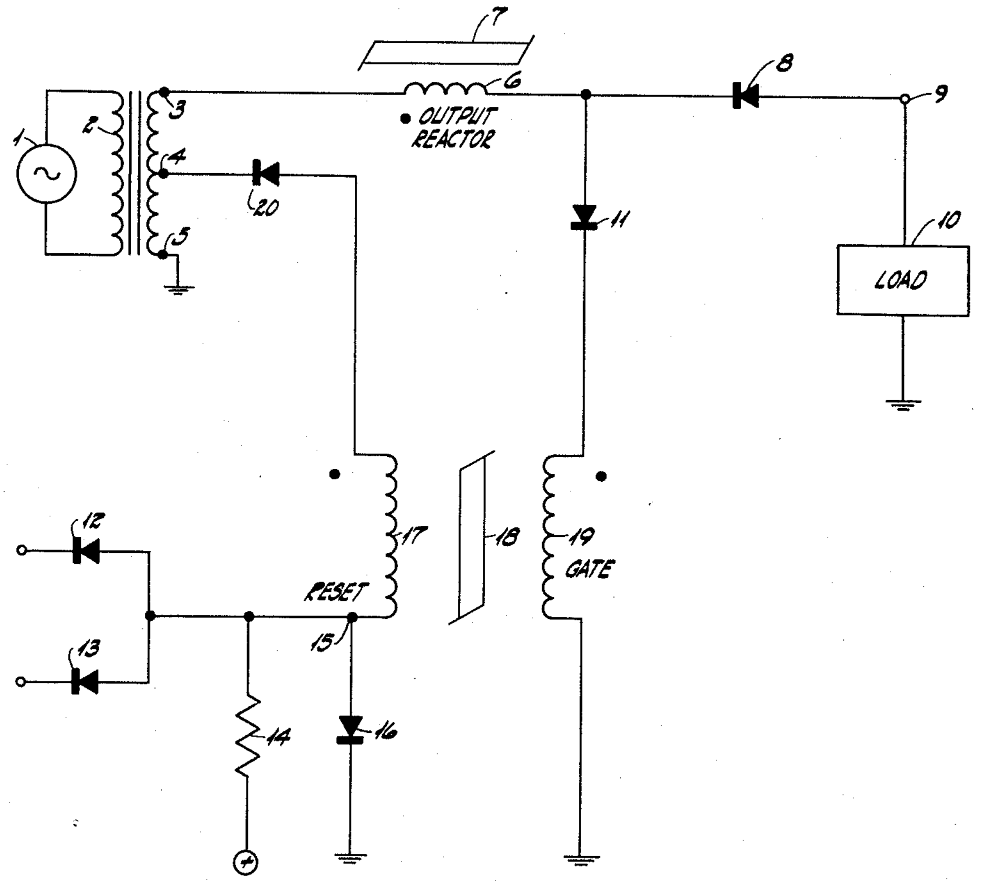
INVENTOR.
A. J. RADCLIFFE, JR.
BY
ATTORNEY 3,133,203
MAGNETIC AMPLIFIER Arthur J. Radcliffe, Jr., Orlando, Fla., assignor to International Telephone and Telegraph Corporation, New York, N.Y., a corporation of Maryland Filed Sept. 2, 1959, Ser. No. 837,662
4 Claims. (Cl. 307—88)

This invention relates to magnetic amplifiers and more particularly to amplifiers having a core with a single winding thereon.

Magnetic amplifiers are devices which rely upon the square hysteresis loop characteristics of magnetic cores to provide electrical amplification of signals which are transmitted through windings associated with such cores. Since the size of a core window limits the amount of wiring which may be wound thereon, it has been necessary to restrict the diameter of the wire which is used, thus limiting the power handling capabilities of the magnetic amplifier. In the past, many magnetic amplifiers—particularly those used in logic circuits—have required at least two windings per core. If one of the windings may be eliminated, it is possible to provide wire having a heavier gauge in the single winding which remains thereby greatly increasing the power handling capabilities of the amplifier. Moreover, since an appreciable time is required to magnetize a core, as compared with the electronic speed at which other circuit elements may operate, it is desirable to retain in the new single winding core the fast response characteristics of the older two winding cores.

An object of this invention is to provide new and improved magnetic amplifiers.

Another object of this invention is to provide magnetic amplifiers having a single winding.

Yet another object of this invention is to provide magnetic amplifiers with great output power capabilities.

Still another object of this invention is to provide magnetic amplifiers having a single winding and a fast response characteristic.

In accordance with this invention, a magnetic amplifier is provided with two cores each having substantially square hysteresis loop characteristics. A first or control core is provided with reset and gate windings while a second or power core is provided with a single input-output winding. Before a core is saturated, substantially all energy applied through its magnetizing winding (i.e. the gate winding of the control core and the single winding of the power core) is utilized to magnetize, or bias the core towards saturation; therefore, the magnetizing windings offer substantially high impedance. After saturation, substantially no energy is dissipated by magnetizing the core; therefore, the magnetizing windings offer very little impedance. When the amplifier is "off" the control core is saturated thus reducing the effective impedance of its gate winding substantially to zero and the power core is unsaturated thus substantially increasing the impedance of the input-output winding.

Any suitable means may be provided for driving the amplifier circuit—an A.C. generator, for example. During first half-cycles in the output of the A.C. generator, the single winding is energized to bias the power core towards saturation. During second half-cycles in the output of the A.C. generator, the single winding is energized in series with the gate winding in a reverse direction to erase or otherwise counteract the magnetic bias produced in the power core during the first half-cycles. Responsive to suitable signals, the control core may be demagnetized; whereupon, the impedance of the gate winding is greatly increased. Since the single winding is connected to be controlled by the gate winding during the second half-cycles, the erasing effects produced by the single winding terminate and the power core is saturated responsive to an occurrence of successive first half-cycles. When the power core is saturated, the impedance of the output winding drops nearly to zero and a relatively large output current flows from the A.C. generator to a load circuit.

The above mentioned and other objects of this invention together with the manner of obtaining them will become more apparent and the invention itself will be best understood by making reference to the following description of an embodiment of the invention taken in conjunction with the accompanying single sheet of drawings which shows a magnetic amplifier.

To facilitate an explanation of this invention, conventional symbols are used in the drawing to indicate the direction of current flow and of core magnetization. Thus, a core is magnetized toward saturation in a first direction (here described as positive) when current flowing in the conventional positive to negative direction enters the dotted end of the winding. When the direction of current flow is reversed, the core is magnetized toward saturation in an opposite direction (here described as negative). When the energizing current is removed, the core flux returns to a level of remanence which is determined by an integration of the volt-second content of energizing or drive pulses applied to a saturating or gate winding. These pulses may recur either cyclically or randomly. During the course of the description which follows, it will be convenient to assign specific directions to current flow and to core saturation. Moreover, it will be convenient to refer to a core as "saturated" or "unsaturated." The term, "saturated," is used herein to mean that core flux has passed the knee of the hysteresis loop so that continued energization of the saturating winding, without reversal of the direction of current flow, produces an extremely small increase in flux density of the core. The term, "unsaturated," is used hereinafter to mean that the core flux has not yet reached the saturation level for the given direction of current flow. Thus, an unsaturated core may have a core flux density at any level slightly less than saturation in one direction to and including saturation in an opposite direction. Quite obviously, reference to specific directions of current flow or of magnetic saturation or to specific levels of magnetic saturation is not to be construed as either excluding opposite directions and other levels or as disclaiming the full range of equivalents which is given under established principles of patent law.

Any suitable device, such as generator 1, provides an output current having half-cycles of alternate polarity which are selectively fed to windings 6, 17, and 19 in accordance with the direction in which diodes 8, 11 and 20 are poled. The circuit values and the frequency of generator 1 are such that the cumulative effects of two half-cycles are required to switch cores 7 and 18 from their negatively saturated to their positively saturated condition. The number of turns in winding 17 is sufficient to switch core 18 to its negatively saturated condition in a single half-cycle.

The circuit operates in the following manner. Generator 1 develops a biasing potential having alternately positive-going and negative-going half-cycles which are applied to the circuit through primary winding 2. Opposite polarities of biasing potential are applied through reset winding 17 and gate winding 19 as determined by the manner in which diodes 11 and 20 are poled. That is, during a first half-cycle, point 4 is at a negative potential and current flows from positive battery through resistance 14, winding 17, diode 20, points 4 and 5 to ground. At the same time, point 3 is also of negative polarity;

therefore, diode 11 blocks the flow of current through winding 19. During the next half-cycle, point 4 is at positive potential, diode 20 blocks the flow of current through winding 17, and diode 11 passes current through winding 19 to ground. Diodes 20 and 11 are poled oppositely so that current cannot flow simultaneously in both windings 17 and 19. Thus, biasing magnetic flux is applied in opposite directions to core 18 by windings 17 and 19. Therefore, the magnetic condition of core 18 is changing constantly.

It is assumed that core 18 is in a non-saturated state and that the driving voltage is positive; therefore, no current flows through diode 20 or winding 17, but current does flow through winding 6, diode 11 and winding 19 to ground. Responsive to the voltage across winding 19, core 18 is magnetically biased toward but not to positive saturation. Also during the half-cycle being described, winding 19 has a relatively great impedance since substantially all of the voltage from generator 1 that is induced across the transformer 2—5 is being absorbed across winding 19. When the half-cycle being described terminates, core 18 retains its magnetic bias.

Next, it is assumed that the control current from generator 1 is in the half-cycle having a polarity which is opposite to that just described. Point 4 is negative; therefore, current flows through the diode 20, winding 17, and resistance 14 to positive battery. Winding 17 is energized while diode 11 blocks current flow through winding 19. Since opposite magnetic effects are produced by windings 17 and 19, the magnetic bias of core 18 that was caused by the energization of winding 19 is erased and core 18 returns to its unsaturated condition. The following half-cycles repeat the process, i.e. core 18 is biased toward positive saturation by current which flows in winding 19 and biased away from positive saturation by current which flows in the winding 17.

Next, it is assumed that a negative input signal is applied to either diode 12 or diode 13. Point 15 has a potential which is equal to or more negative than the potential that is applied through the transformer to point 4. Therefore, diode 20 is back biased and no current may flow through winding 17 during the negative half-cycles. During the next positive half-cycles, gate winding 19 is energized and there is a cumulative effect until core 18 is driven to positive saturation. The magnetic amplifier is now in an "off" condition, i.e. core 18 is positively saturated. Before saturation, the impedance of winding 19 is very great; after saturation it is very small.

Now consider the manner in which core 7 reacts to current flow through winding 6 responsive to the driving current emanating from generator 1. During half-cycles when point 3 has a negative polarity, there is a current flow in the circuit which may be traced from ground through load 10, point 9, diode 8, winding 6, and point 3 which is at a negative potential. Winding 6 is energized in a direction which biases core 7 toward negative magnetic saturation. During half-cycles when point 3 has a positive polarity, an energizing circuit may be traced from the positive voltage at point 3 through winding 6, diode 11 and the gate winding 19 to ground. This time the direction of current flow in winding 6 is such that the magnetic effects produced in core 7 during the previous half-cycle are erased. As generator 1 produces alternately positive-going and negative-going half-cycles, core 7 is magnetically biased toward and away from saturation. The characteristics of the circuit are such that core 7 is not saturated, the impedance of winding 6 is relatively great, and load 10 does not respond to the relatively low level of current flow through it.

To turn "on" the amplifier, the negative potential which was applied through diodes 12 and/or 13 is removed. The first time that point 4 has a negative polarity thereafter, current flows from point 4 through diode 20, winding 17, and resistance 14 to positive battery. Core 18 is switched from its positive saturated to its unsaturated state. During the next half-cycle, windings 19 and 6 are energized in series; however, the impedance of winding 19 is very great since substantially all of the voltage that is introduced through transformer winding 2 is being absorbed across windings 19 owing to the magnetizing effects produced in core 18. During the next half-cycle when point 3 has a negative polarity, core 7 is biased toward negative saturation by the current which flows through load 10, point 9, diode 8, winding 6, and point 3. During the next half-cycles when point 3 has a positive polarity, the impedance of winding 19 is relatively great; very little current flows through winding 6 and the preceding half-cycles' magnetic effects on core 7 are not erased.

The cumulative effects of two successive half-cycles with no intermediate erasing, biases core 7 to negative saturation whereupon the effective impedance of winding 6 is reduced substantially to zero. Thereafter, the current which flows through diode 8 and load 10 is relatively great. Load 10 is adapted to respond to the increased current flow which is occasioned by the drop of impedance in winding 6 after core 7 is saturated.

To turn "off" the amplifier, a negative control voltage is reapplied through either diode 12 or diode 13 thereby blocking the reset current which flows through winding 17. Core 18 saturates in a positive direction and the impedance of winding 19 drops as explained above. Thereafter, when generator 1 produces a positive polarity at point 3, current flows through winding 6, diode 11 and winding 19 to erase or demagnetize core 7, thus switching it to its unsaturated state. Thereafter, the impedance of winding 6 is relatively great and a low level of current flows through load 10 where any suitable means is adapted to respond thereto.

If two circuits are provided with the diodes poled to provide opposite responses to each half-cycle, a full wave output may be delivered to load 10.

While the principles of the invention have been described in connection with specific apparatus, it is to be clearly understood that this description is made only by way of example and not as a limitation on the scope of the invention.

I claim:

1. A magnetic amplifier circuit comprising two magnetic cores, each having two stable states of magnetization, supply means for providing control signals having first and second half-cycles, means responsive to said first half-cycle for magnetically biasing both of said cores toward a first of said stable states of magnetization, means responsive to said second half-cycle for magnetically biasing said one core toward a second stable state of magnetization while said other core remains biased toward said first stable state of magnetization and reaches said first stable state responsive to said first half-cycle, control means for preventing the effect of said first half-cycles on said one core thereby switching said one core to said second stable state of magnetization, and means responsive to said switching of said one core to said second stable state for enabling the effects of said second half-cycle on said other core thereby preventing the switching said other core to said first stable state.

2. A magnetic amplifier comprising, a magnetic device including a plurality of windings associated with a first core member having substantially square hysteresis loop, means for producing biasing potential, means for periodically applying biasing potential to energize one of said windings to bias said first core toward magnetic saturation, means for periodically applying said biasing potential to energize another of said windings to bias said first core away from magnetic saturation, means responsive to an input signal for preventing current flow through said other winding whereby said first core saturates responsive to said first mentioned periodically applied biasing potential, a second magnetic device consisting of a single winding associated with a second core member having a substantially square hysteresis loop, means for periodically applying said biasing potential through said single winding in a first direction to bias said second core toward magnetic saturation, means for periodically applying said biasing potential through said one winding and said single winding in series to energize said single winding in reverse direction for biasing said second core away from magnetic saturation, whereby current flow in said reverse direction of said single winding is controlled by the effective impedance of said one winding as it changes in accordance with saturation of said first core member.

3. An electrical logic circuit comprising two magnetic devices each having substantially square hysteresis loop characteristics, two windings associated with one of said magnetic devices and a single winding associated with the other of said magnetic devices, means for providing biasing potential of periodically reversing polarity, a plurality of uni-directional means for conducting current of one polarity, means for connecting a first of said two windings through one of said uni-directional means to said means for providing biasing potential, means for connecting the second of said two windings and said single winding through an oppositely poled one of said uni-directional means to said means for providing biasing potential, and means comprising a third of said uni-directional means poled oppositely to said second mentioned uni-directional means connected in parallel with said second winding to provide an alternate path for the flow of current through said single winding.

4. An electrical logic circuit comprising a magnetic amplifier including a core having substantially square hysteresis loop characteristics, a single winding associated with said core, means for producing biasing potential of periodically reversing polarity connected to one end of said winding, first and second uni-directional means coupled in parallel to the other end of said winding, said first uni-directional means being poled to conduct one polarity of said biasing potential, said second uni-directional means being poled to conduct the other polarity of said biasing potential, means including a gate winding on a second core connected to control current passing through one of said uni-directional means, there being a relatively high level of current flow through said one uni-directional means when said second core is saturated and a relatively low level of current flow when said second core is unsaturated, and an output circuit connected to be energized by current passing through the other of said uni-directional means.

References Cited in the file of this patent

UNITED STATES PATENTS

| | | |
|---|---|---|
| 2,741,758 | Cray | Apr. 10, 1956 |
| 2,751,510 | Bonn | June 19, 1956 |
| 2,896,091 | Nuttall | July 21, 1959 |
| 2,898,043 | Mathias et al. | Aug. 4, 1959 |
| 2,901,636 | Torrey et al. | Aug. 25, 1959 |